US007747734B2

(12) United States Patent
Aldereguia et al.

(10) Patent No.: US 7,747,734 B2
(45) Date of Patent: Jun. 29, 2010

(54) APPARATUS, SYSTEM, AND METHOD FOR ERROR ASSESSMENT OVER A COMMUNICATION LINK

(75) Inventors: Alfredo Aldereguia, Cary, NC (US); Grace Ann Richter, Chapel Hill, NC (US); Jeffrey B. Williams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 11/277,868

(22) Filed: Mar. 29, 2006

(65) Prior Publication Data

US 2007/0233847 A1    Oct. 4, 2007

(51) Int. Cl.
*G01R 31/08* (2006.01)
*G01R 31/28* (2006.01)
*G06F 11/00* (2006.01)
*G06F 15/16* (2006.01)
*G06F 15/173* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ............... 709/224; 370/230; 370/232; 370/235; 370/244; 370/245; 370/252; 370/253; 709/223; 709/250; 714/25; 714/32; 714/712

(58) Field of Classification Search ............... 709/224, 709/223, 250; 370/230, 232, 235, 244, 245, 370/252, 253; 714/25, 32, 712
See application file for complete search history.

(56) References Cited

U.S. PATENT DOCUMENTS

| 4,864,560 | A |   | 9/1989  | Quinquis et al. ............ 370/60  |
| 5,199,028 | A |   | 3/1993  | Arnold .................... 370/60  |
| 5,271,000 | A | * | 12/1993 | Engbersen et al. ......... 370/244 |
| 5,343,463 | A | * | 8/1994  | van Tetering et al. ...... 370/253 |
| 5,481,735 | A | * | 1/1996  | Mortensen et al. ......... 709/246 |
| 5,563,875 | A | * | 10/1996 | Hefel et al. .............. 370/249 |

(Continued)

FOREIGN PATENT DOCUMENTS

JP        2003069628        3/2003

OTHER PUBLICATIONS

Newton, Harry. Newton's Telecom Dictionary, Feb. 2006, CMP Books, 22ed, pp. 180, 189, 215, 357, 581, 715-716, and 812.*

(Continued)

*Primary Examiner*—Tonia L Dollinger
*Assistant Examiner*—Daniel C Murray
(74) *Attorney, Agent, or Firm*—Kunzler Needham Massey & Thorpe (57) ABSTRACT

An apparatus, system, and method are disclosed for assessing error over a communication link. The apparatus for assessing error is provided with a logic unit containing a plurality of modules configured to execute the necessary steps of creating one or more test packets, determining an amount of test packets to send over a communication link to a receiving node, sending a plurality of test packets over the communication link to a receiving node, interspersing test packets throughout a plurality of data packets such that the receiving node is able to continually process the data packets, and checking test packets received by the receiving node for errors.

24 Claims, 5 Drawing Sheets

U.S. PATENT DOCUMENTS

| | | | | |
|---|---|---|---|---|
| 5,790,523 | A * | 8/1998 | Ritchie et al. | 370/241 |
| 5,802,105 | A * | 9/1998 | Tiedemann et al. | 375/225 |
| 5,936,940 | A * | 8/1999 | Marin et al. | 370/232 |
| 6,014,760 | A | 1/2000 | Silva et al. | 714/46 |
| 6,061,722 | A * | 5/2000 | Lipa et al. | 709/224 |
| 6,061,725 | A * | 5/2000 | Schwaller et al. | 709/224 |
| 6,182,142 | B1 * | 1/2001 | Win et al. | 709/229 |
| 6,188,698 | B1 | 2/2001 | Galand et al. | 370/412 |
| 6,263,373 | B1 | 7/2001 | Cromer et al. | 709/250 |
| 6,360,268 | B1 | 3/2002 | Silva et al. | 709/227 |
| 6,363,053 | B1 * | 3/2002 | Schuster et al. | 370/230 |
| 6,411,623 | B1 | 6/2002 | DeGollado et al. | 370/395.1 |
| 6,560,720 | B1 * | 5/2003 | Chirashnya et al. | 714/32 |
| 6,628,621 | B1 * | 9/2003 | Appleton et al. | 370/249 |
| 6,711,137 | B1 * | 3/2004 | Klassen et al. | 370/252 |
| 6,885,641 | B1 | 4/2005 | Chan et al. | 370/252 |
| 7,061,927 | B2 * | 6/2006 | Panigrahy et al. | 370/419 |
| 7,239,611 | B2 * | 7/2007 | Khisti et al. | 370/230 |
| 7,305,464 | B2 * | 12/2007 | Phillipi et al. | 709/223 |
| 2002/0114332 | A1 * | 8/2002 | Apostolopoulos et al. | 370/392 |
| 2002/0152303 | A1 * | 10/2002 | Dispensa | 709/224 |
| 2003/0050954 | A1 * | 3/2003 | Tayyar et al. | 709/102 |
| 2003/0115368 | A1 | 6/2003 | Wu | |
| 2003/0163772 | A1 * | 8/2003 | Jaworski | 714/704 |
| 2003/0212932 | A1 * | 11/2003 | Sauber et al. | 714/712 |
| 2004/0076138 | A1 * | 4/2004 | Serceki et al. | 370/349 |
| 2004/0174815 | A1 * | 9/2004 | Khisti et al. | 370/235 |
| 2004/0258226 | A1 * | 12/2004 | Host | 379/106.01 |
| 2005/0226263 | A1 * | 10/2005 | Panigrahy et al. | 370/419 |
| 2005/0262402 | A1 * | 11/2005 | Ballester et al. | 714/704 |
| 2007/0050773 | A1 * | 3/2007 | Tayyar et al. | 718/102 |
| 2008/0079572 | A1 * | 4/2008 | Tsaba et al. | 340/552 |
| 2008/0212488 | A1 * | 9/2008 | Okada et al. | 370/253 |
| 2008/0221860 | A1 * | 9/2008 | Jacobus et al. | 703/25 |

OTHER PUBLICATIONS

Choi et al., "A Network Management Approach for QoS Evaluation of IP Multimedia Sercives" Advances in Information Systems. Third International Conference, Advis 2004. Proceedings (Lecture Notes in Computer Science vol. 3261) Springer-Verlag Berlin, Germany, 2004 pp. 605-614, XP002442218.

CoreWare, 1x/4x Serial RapidIO Core CW000900, LSI Logic, http://www.lsilogic.com/files/docs/marketing_docs/interface_cores/1x_4xserial_rapid_io_core.pdf, 2004.

* cited by examiner

APPARATUS, SYSTEM, AND METHOD FOR ERROR ASSESSMENT OVER A COMMUNICATION LINK

BACKGROUND OF THE INVENTION

1. Field of the Invention

This invention relates to assessing errors over a communication link and more particularly relates to real-time scalability port assessment of high-speed serial links.

2. Description of the Related Art

In today's business world, vast amounts of information are generated. This information is often vital to the success of a business and may be the business' most valued commodity. Information must be processed, stored, updated, and shared by the business' operational units. For example, a manufacturer must be able to share information with its sales offices, its support staff, its suppliers, its distributors, and various other entities. As a result, many businesses utilize an information storage system that may be centrally located and that everyone associated with the business can access. One such information system is an Enterprise Information System (EIS). A business may have several sub-entities or "clients" that access one or more EISs.

Business may utilize one processor to manage its information. More likely however, a business will have multiple processors linked together to increase performance and computing power. Many systems combine processors and data-storage units into a variety of configurations, including shared memory systems or distributed memory systems. A collection of processors may be arranged such that each processor may read memory attached to a different processor. This arrangement of processors is often called a cluster. Each processor may instead be connected directly to each memory unit attached to a processor in this multi-processor arrangement and can access data directly. Often four or more processors and their memory units are arranged in a shared memory configuration in a single box called node. Nodes can then be connected together.

No matter what the arrangement, processors, clusters, or nodes are most likely connected to each other by communication links that are usually cables plugged into various ports. The cables are often high-speed interconnection cables plugged into serial ports. As arrangements of processors and memory units become more complex, the probability of data transfer error over these communication links increases. Thus, the various ports or links connecting multiple processors or systems are often tested to assess error in data transfer and performance.

Communication link performance can be affected by a number of different factors, including voltage, board impedance, temperature, cable lengths, connectors, and the like. If a port or link goes completely bad, or the cable is disconnected, the connection may cease to work. However, there are instances when a cable may not be seated properly, or go partially bad and the connection is merely degraded, not dead.

Most systems test for errors by sending high volumes of data to the receiving node or port. That node or port in turn sends out acknowledgements that contain the high volume data to be checked via counters. Performance error can then be calculated. The problem with this and most other methods is that the test monopolizes the link which disables all other traffic across the link. This prevents the nodes or ports from being used or tested correctly.

From the foregoing discussion, it should be apparent that a need exists for an improved apparatus, system, and method that assesses error over a communication link. Beneficially, such an apparatus, system, and method will allow port error assessment to occur over a port that is being used without disabling the port. Such an apparatus, system, and method would also allow a port error assessment to occur while maintaining the features of a running system, such as high data rates and random data send capability while the test is active. Such an apparatus, system, and method are disclosed and claimed herein.

SUMMARY OF THE INVENTION

The present invention has been developed in response to the present state of the art, and in particular, in response to the problems and needs in the art that have not yet been fully solved by currently available error assessment apparatus, systems, and methods. Accordingly, the present invention has been developed to provide an apparatus, system, and method for assessing error over a communication link that overcome many or all of the above-discussed shortcomings in the art.

The apparatus to assess error over a communication link is provided with a plurality of modules configured to functionally execute the necessary steps of creating one or more test packets, determining an amount of test packets to send over a communication link to a receiving node, sending a plurality of test packets over the communication link to a receiving node, interspersing test packets throughout a plurality of data packets such that the receiving node is able to continually process the data packets, and checking test packets received by the receiving node for errors. As used throughout this disclosure, reference to the communication link may also include the receiving node and vice versa.

These modules in the described embodiments include a creation module, a determination module, a sending module, an interspersing module, and a checking module. The apparatus, in one embodiment, is configured to create test packets and determine an amount of test packets to send over a communication link to the receiving node in order to test that communication link and/or receiving node for errors. The apparatus may also be configured to send a plurality of test packets interspersed with regular data packets at a rate that does not disable the receiving node. The apparatus checks the test packets received for errors.

The apparatus is further configured, in one embodiment, to selectively assign a priority to test packets. The test packets may be sent until a predetermined threshold of test packets has been reached. In one embodiment, this threshold is determined in order to send enough test packets to emulate a predetermined error rate for the receiving node. In one embodiment, the apparatus records test packet errors in an error register.

A system of the present invention is also presented to assess errors over a communication link. The system may be embodied as cluster of nodes or in a multiple computing machine configuration. In one embodiment, the system is embodied as one or more scalable enterprise servers.

The system may include at least one Central Processing Unit (CPU) and a processor. The system may also include a cache and a cache controller. The system includes at least one port for connecting to a communication link. A memory may contain modules for execution on the processor. In one embodiment, the modules include those modules that make up the apparatus described above. The system may contain a creation module for creating one or more test packets, a sending module for sending a plurality of test packets over the communication link to a receiving node, and an interspersing module for interspersing test packets throughout a plurality of data packets such that the receiving node is able to continually process the data packets. In one embodiment, the memory contains a checking module for checking test packets received by the receiving node for errors. A bus operably connects the at least one CPU, processor, cache, cache controller, port, and memory.

A method of the present invention is also presented for assessing error over a communication link. The method in the disclosed embodiments substantially includes the steps necessary to carry out the functions presented above with respect to the operation of the described apparatus and system. In one embodiment, the method includes creating one or more test packets and determining an amount of test packets to send over a communication link to a receiving node. The method may also include sending a plurality of data packets over the communication link to a receiving node and sending one or more test packets over the communication link to the receiving node. In one embodiment, the test packets are interspersed throughout the data packets at a rate that does not disable the receiving node. The test packets are checked for errors. The method steps disclosed herein may also be embodied as operations carried out by the computer-readable code of a computer program product.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal-bearing medium may take any form capable of generating a signal, causing a signal to be generated, or causing execution of a program of machine-readable instructions on a digital processing apparatus. A signal bearing medium may be embodied by a transmission line. Reference to a non-transitory, computer usable storage medium may take the form of a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
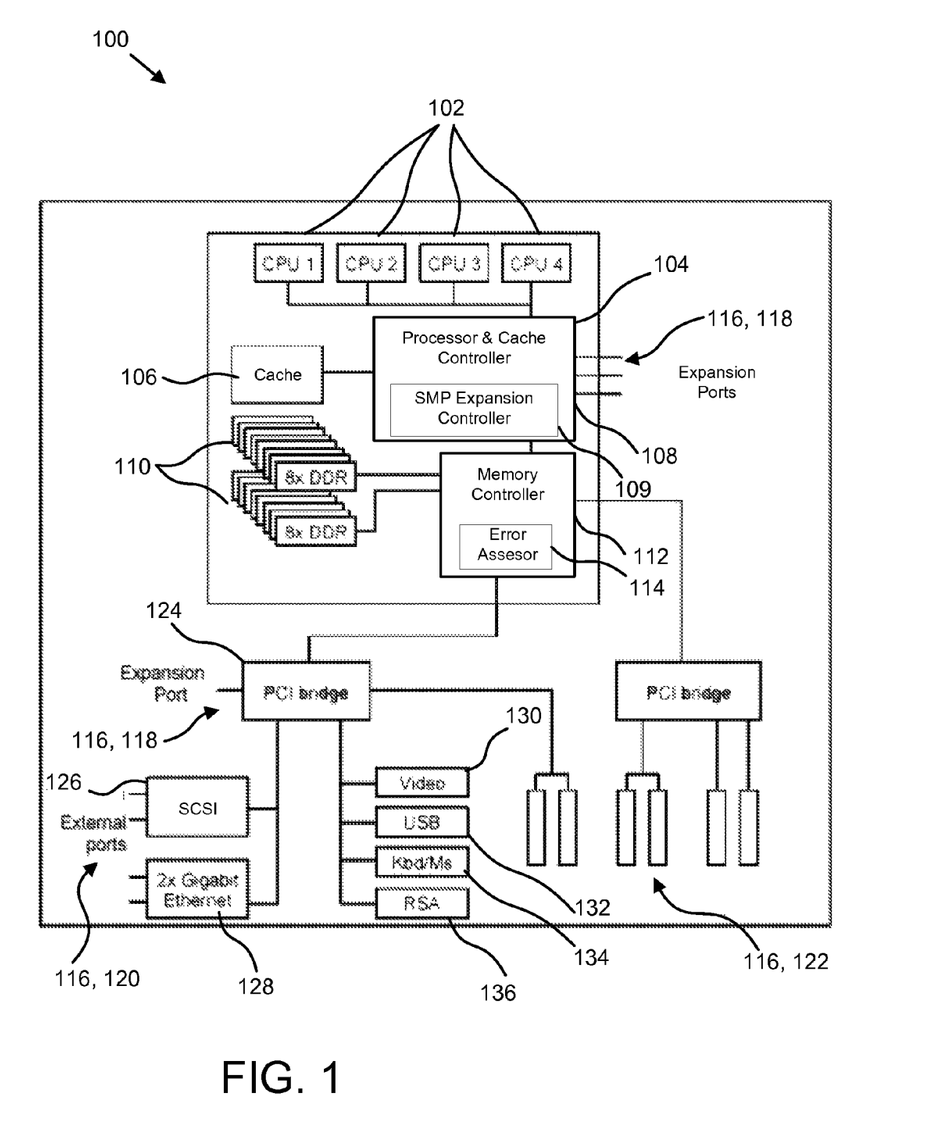
FIG. 1 is a schematic block diagram illustrating one embodiment of a system for automatically detecting a cable configuration.

FIG. 1 illustrates a schematic block diagram of one embodiment of a system 100 for assessing error over a communication link, in accordance with the present invention. In one embodiment, the system 100 is a scalable enterprise server. The system 100 includes at least one Central Processing Unit 102. In one embodiment, the system 100 includes four CPUs 102 tightly packed together to form a node. The system 100 includes a processor 104. The processor in one embodiment is a 2.8 GHz processor. In other embodiments, the processor is a 3.0 GHz processor. The system 100 also includes cache 106 and a cache controller 108. The cache may be 2 MB L3 cache. In one embodiment, the cache is XceL4 Server Accelerator Cache. The controller 108 in one embodiment includes or is configured as an SMP Expansion Controller 109. The SMP Expansion Controller 109 allows high speed communication between multiple systems. It will be appreciated by those of skill in the art that a variety of processors and hardware configuration could be used to practice the teachings of this invention. In one embodiment, the system is upgradeable to include four-way, eight-way, sixteen-way and thirty-two-way processing.

The system 100 includes memory 110 and a memory controller 112. In one embodiment, the memory is active memory with memory mirroring, hot-swap, and hot-add capabilities. In one embodiment, the memory 110 includes 2 gigabytes of DDR memory that is expandable to 64 gigabytes per eight-way system. It will be appreciated by those of skill in the art that the memory can be expanded to conform to the size of the system.

In one embodiment the memory includes an error assessor 114. As will be discussed in greater detail below, the memory controller includes modules for execution on a processor that make up the error assessor. In one embodiment, the modules or the error assessor form part of the SMP Expansion Controller 109. In one embodiment, the memory controller includes a creation module for creating one or more test packets. It may also include a determination module for determining an amount of test packets to send over a communication link to a receiving node. The memory controller 112 may also include a sending module for sending a plurality of test packets over the communication link to a receiving node. An interspersing module may intersperse the test packets throughout a plurality of data packets such that the receiving node is able to continually process the data packets. A checking module may check test packets received by the receiving node for errors. It will be appreciated by those of skill in the art that the error assessor may reside in the memory 110.

The system 100 includes at least one port 116 for connecting to a communication link. In one embodiment, the system 100 includes multiple expansion ports 118 and external ports 120. In one embodiment, the ports 116 include peripheral component interconnects (PCI) slots 122 connected via a PCI bridge 124. The port 116 may also be a high-speed serial port. As used herein, the term port can also be a node or a receiving node.

The system 100 may include a small computer system interface (SCSI) 126 in communication with the processor by means of a PCI bridge 124. In one embodiment, the SCSI 126 may be a dual channel SCSI with integrated and supported by a redundant array of independent disks (RAID). The system 100 may also include an Ethernet 128 connection. In one embodiment, the Ethernet 128 connection is an integrated dual Gigabit Ethernet 128.

The system 100 may also have connections for video 130, universal serial bus (USB) 132, Keyboard and Mouse 134, and a remote supervisor adapter (RSA) 136. The system 100 includes a bus 138 for operably connecting the at least one CPU 102, processor 104, cache 106, cache controller 108, port 116, memory 110, memory controller 112. In one embodiment, the bus 138 operably connects the SCSI 126, Ethernet 128, video 130, USB 132, Keyboard/Mouse 134, and RSA 136.

It will be appreciated by those of skill in the art that the system 100 illustrated may comprise and SMP expansion module or central electronics complex (CPC). In one embodiment, discussed in greater detail below, two SMP expansion modules may be connected together using two of the expansion ports to form a single-node eight-way configuration. However, the PCI Bridge 124 also has a bidirectional Remote Expansion I/O ports (RXE port) for connectivity to a remote configuration manager (see FIG. 2).

Figure 2:
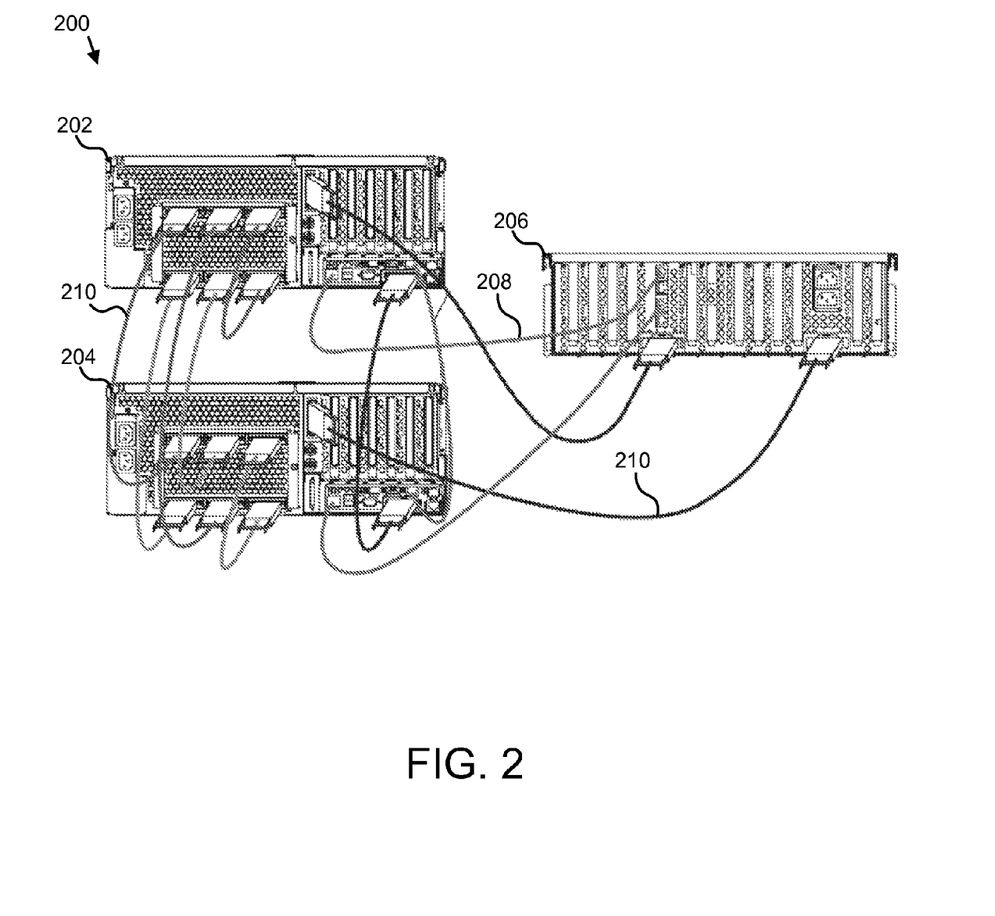
FIG. 2 is a rear view illustration of one embodiment of a system of the present invention incorporating a pair of enterprise servers.

Referring now to FIG. 2, an embodiment of the system 200 includes a plurality of scalable enterprise servers. It will be appreciated by those of skill in the art that scalability allows for system upgrading and expanding for increased capacity, functionality and performance. In this example, the system 200 includes a first server 202, a second server 204, and a remote configuration manager 206. The first server 202 and the second server 204 are connected using high-rate data cables 210. Additionally, the first server 202 and the second server 204 are connected to the remote configuration manager 206 using off-line communication cables such as Ethernet cables 208 and high-rate data cables 210. The configuration manager 206 may generate a connection topology map of the connections between the first server 202 and the second server 204. Additionally, the configuration manager 206 may manage communication arbitration between the first server 202 and the second server 204. It will be appreciated by those of skill in the art that the error assessor 116 could be in one or more servers 202, 204 or in the remote configuration manager 206.

Accordingly, FIG. 1 illustrates an embodiment of a basic system 100. The use of various links 210, allows the connection of the system in FIG. 1 to another system, which provides for system scalability. In the embodiment illustrated in FIG. 2, the system in FIG. 1 is connected together, via high-speed links, with another four CPUs memory and PCI slots. It will be appreciated by those of skill in the art that the system 200 may include any number of systems tied together. For example, two systems may be tied together to appear like an "8-way" system. In one embodiment, four systems could be coupled together to appear like a "16-way" system. In another embodiment, systems and/or nodes could be configured to appear like a "32-way" system, and the like.

These "multi-node" systems may be tied together over a high-speed serial link. As is illustrated in FIG. 2, the chassis 202 and 204 may be connected by SMP expansion connections. The remote configuration manager 206 or "RXE expansion connection" is often used to provide more Input/Output capability. The chassis 202 and 204 in one embodiment are an example of a multi-node system. In the embodiment illustrated in FIG. 2, each chassis 202 and 204 includes up to eight processors in a single chassis.

Figure 3:
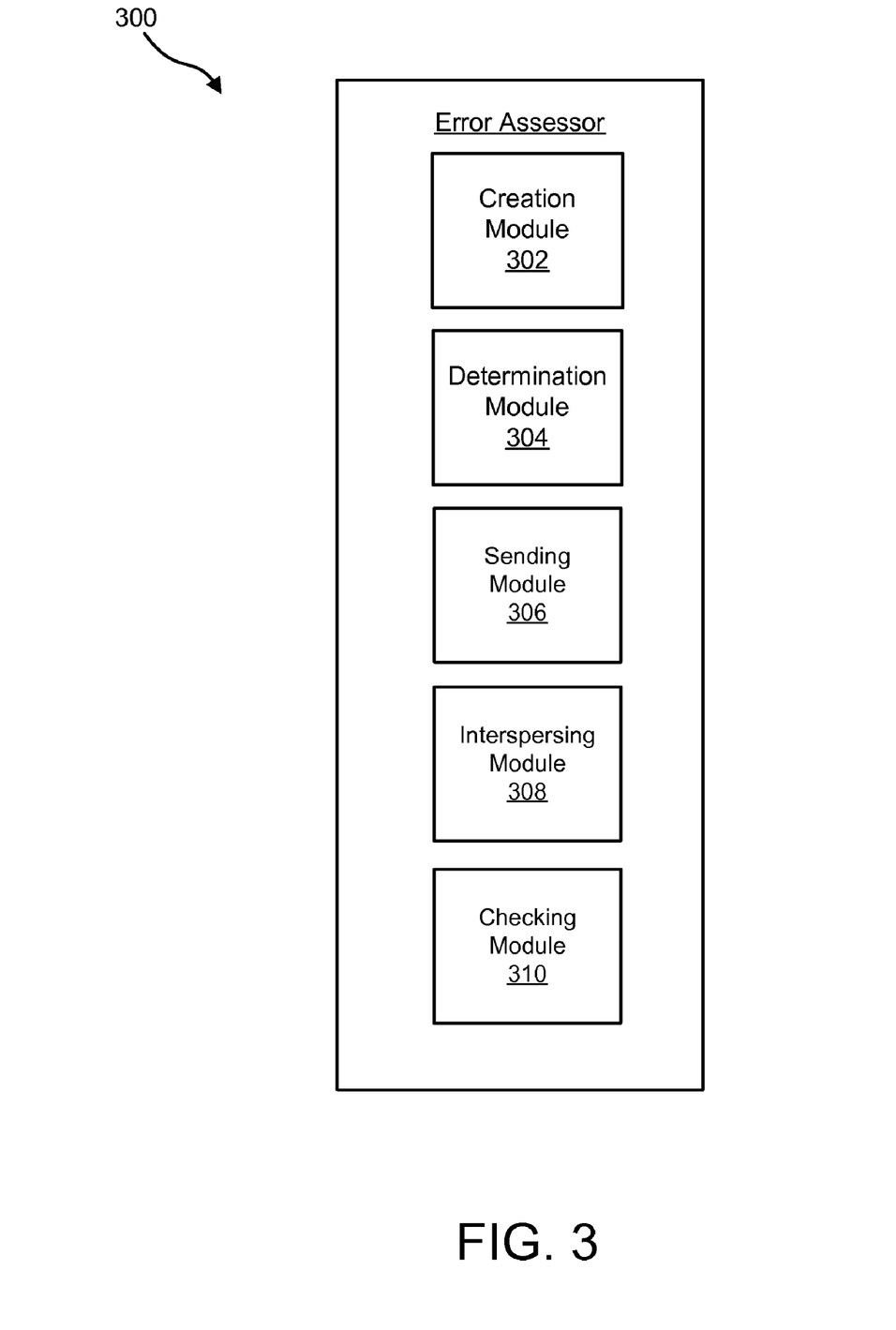
FIG. 3 is a schematic block diagram illustrating one embodiment of an apparatus for assessing error over a communication link.

Referring now to FIG. 3, an apparatus 300 for assessing error over a communication link is illustrated. The apparatus includes a creation module 302 for creating one or more test packets. In one embodiment, each test packet holds two kilobytes of data. It will be appreciated by those of skill in the art that the creation module 302 may create test packets of various size and length. The test packets are configured for sending over a communication link to a receiving node. The test packets may include one or more bytes of header information and may include a header or footer to facilitate checking any errors in the test packet on the other side of the communication link. The communication link may include without limitation a serial port, a point of connection, and the like. The test packet may contain predetermined data, which allows for a better comparison when the packet is received on the other end of the communication link.

The apparatus 300 also includes a determination module 302 for determining an amount of test packets to send over a communication link to a receiving node, in order to assess error over the communication link. In one embodiment, the amount of test packets is a percentage of the overall packets sent to the receiving node. For example, the apparatus 300 may send a collection of packets over a communication link containing approximately one percent test packets and ninety-nine percent regular data packets. In another embodiment, the test packets may include up to about ninety percent of the packets sent.

The determination module 304 may determine the amount of test packets to send based on a predetermined time threshold. For example, the apparatus 300 may send test packets for one or more predetermined amounts of time. In another embodiment, the number of test packets sent may include a predetermined number. In another embodiment, the amount of test packets sent approximates a predetermined error rate for the receiving node. If the receiving node has an industry standard error rate, the determination module 304 may determine to send enough test packets to approximate the known error rate. For example, if the error rate for a particular receiving node is 1 error for every $10^{-9}$ bytes of data, the determination module may send $10^{-9}$ bytes of test packets in order to get a better idea of the error situation in the receiving node. It will be appreciated by those of skill in the art that to approximate a low error rate for a receiving node, enough data must be sent over the communication link to the receiving node.

In one embodiment, the determination module 304 monitors the amount of traffic over the communication link to determine how many test packets to send over the communication link. For example, the determination module 304 may analyze many jobs are in queue for sending over the communication link to the receiving node. The determination module 304 may also monitor the performance of the receiving node and increase the number of packets sent until the performance of the receiving node slows to a certain level. Thus the determination module 304 may determine to send enough test packets in order to adequately assess the errors occurring over communication link, while not disabling the communication link.

The apparatus 300 includes a sending module 306 for sending a plurality of test packets over the communication link to a receiving node. In one embodiment, the sending module 306 is configured to send one or more data packets over the communication link to the receiving node. The sending module 306 may include appropriate headers and other information necessary to send both test packet data and/or regular data. In one embodiment the functions of the sending module are performed by programmed logic. In another embodiment, the functions of the sending module are performed by the system hardware.

The sending module 306 assigns a priority to each test packet. In one embodiment, different priorities are assigned to different test packets. Various priorities may be assigned test packets relative to the order in which the test packets are sent. The test packets are marked as test packets and are sent to the receiving node of the communication link, which in one embodiment, is a Scalability/RIO link. In one embodiment, the test packets are high priority packets. The sending module 306 may assign the same or different priorities to consecutive test packets. The test packets may be then be sent with priority arbitration. For example, the test packets may be sent over the communication link utilizing priority with fairness arbitration. It will be appreciated by those of skill in the art that a number of priority and arbitration schemes may be utilized to send data packets interspersed with test packets.

The test packets may be sent sequentially to allow for interaction over the communication link between packets. In one embodiment, the sending module 306 sends a threshold level of test packets to emulate a predetermined error rate for the receiving node. As discussed above, the threshold may be based upon a known average error rate for a particular communication link or receiving node. The sending module 306 may continue to send test packets until the predetermined threshold is reached. The sending module 306 may also regulate the rate at which test packets are sent in order to prevent sending too many test packets, which could disable the communication link. The sending module 306 is capable of sending both test packets and regular data packets.

The apparatus 300 includes an interspersing module 308 for interspersing test packets throughout a plurality of data packets such that the receiving node is able to continually process the data packets. The receiving node is able to continually process data packets when the communication link is not disabled. It will be appreciated by those of skill in the art that sending too many test packets at one time may cause the communication link and/or the receiving node to become disabled relative to regular data traffic. The receiving node, under these circumstances, is unable to continually process regular data packets. The interspersing module 308 intersperses test packets into the regular packet data stream at a rate that allows the receiving node and/or the communication link to continue to process regular data packets.

The test packets may be interspersed by sending the test packet altogether at the beginning, ending, or middle of the regular data packet stream. The test packets may be interspersed by sending groups of one or more test packets at the beginning, ending, or middle of the regular data packet stream. In one embodiment, interspersing module 308 randomly intersperses test packets throughout the data packets, or data packet stream. In one embodiment, the interspersing is accomplished by software. In another embodiment, the hardware's random number generator allows the test packets to be randomly interspersed into the data packet stream.

The apparatus 300 also includes a checking module 310 for monitoring or checking test packets received by the receiving node for errors. In one embodiment, the checking module 310 only checks test packets for errors. In one embodiment, the checking module 310 employs error counters in the receiving node. The error counters are set to only store information from the test packets during the test, thus collecting information on the number of packets received, and the number of packets with errors. It will be appreciated by those of skill in the art that this allows the system to perform calculations on the error rates, while the system is running normal traffic. In one embodiment, the checking module 310 checks for errors based on a known test packet size.

In one embodiment, the checking module 310 checks for error over the communication link using cyclic redundancy code (CRC) checking. The checking module 310 may use a multi-byte CRC error-checking protocol on all data transmissions over the communication link between receiving nodes. The sending system may calculate a CRC and append it to the data being sent. The receiving system will calculate a new CRC based on the entire message—including the appended CRC bytes.

In another embodiment, the checking module 310 checks for error over the communication link using bus parity checking to verify that data has not been changed during a data transfer operation. The checking module 310 may also employ channel check reporting and error logging to detect hardware errors and record the errors. It will be appreciated by those of skill in the art that the checking module 310 may employ other methods to check for errors in a particular data stream.

The apparatus 300 may also include a register for selecting the priority of one or more test packets. The register may be defined within the apparatus or system chipset to allow the register to determine the test packet utilization rate. In one embodiment, the register is programmable. The register can program the rate at which test packets are sent. For example, the register may be programmed with a value between zero and ten for providing between 0 and 100 percent test utilization respectively. For example, the register may provide that a number "n" out of every ten packets may be test packets. The remaining 10-n packets are regular or non-test data traffic.

The register may be an error register and the checking module 310 may record test packet errors in the error register. In one embodiment, the apparatus includes several registers. The register may be programmed to record only the test packets and note which test packets have errors. In one embodiment, no information is collected in the error register regarding regular data traffic during any test period.

Thus, the system allows the error assessor apparatus 300 to pace the amount of data that is transferred over a particular link. The system may allow a burst of a lot of data for a short amount of time, or a burst of a small amount of data for a long time, without killing the link. This allows for the system or a user to perform diagnostics while the system is still running. Accordingly, the system allows the test of a link without shutting down the system. It performs diagnostics on a multi-node links while the system is still running.

It will be appreciated by those of skill in the art that some of the functions of the various modules may overlap or be performed by other modules. For example, determining the number of test packets to send may be performed by the creation module 302. Furthermore, some or all of the functions of the determination module 304 may be performed by the sending module 306 and some or all of the function of the sending module 306 may be performed by the determination module 304. Similarly, some or all of the interspersing module 308 may be performed by the sending module 306, and vice versa. It will further be appreciated that the functions of the apparatus 300 may be performed by software executing on the processor or by the register defined in the apparatus' or system's hardware or firmware.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
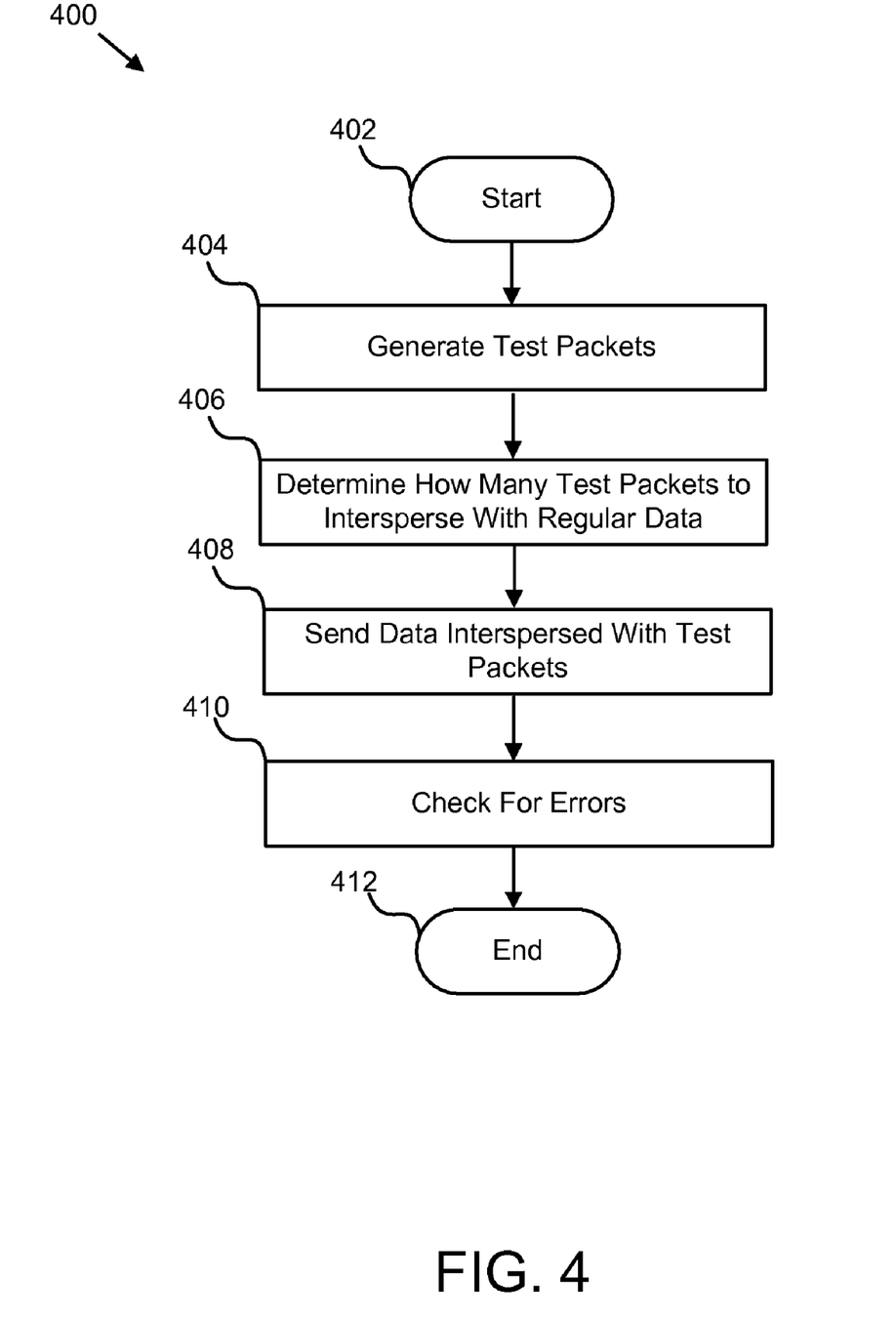
FIG. 4 is a schematic flow chart diagram illustrating one embodiment of a method for assessing error over a communication link.

Referring now to FIG. 4, a method 400 of assessing error over a communication link is illustrated. In one embodiment method steps include those necessary to perform the functions of the system and apparatus outlined above. The method 400 starts 402 and creates 404 one or more test packets for sending over a communication link to a receiving node. The method 400 then determines 406 an amount of test packets to send over the communication link to a receiving node. Determining the amount of test packets may include monitoring the amount of data packets sent over the communication link. If the volume of test packets to be sent is enough to choke of the communication link to regular data traffic, fewer test packets are sent. In one embodiment, the determination of whether to send more test packets is made on the fly. As discussed above, the determining step 406 may include determining a percentage of the number of packets sent to the receiving node to be allocated for sending test packets. It may also include determining a specific number of test packets to send or a rate at which to send the test packets. The determining step 406 may also determine an amount of time to send test packets.

A plurality of test packets are sent over the communication link to the receiving node along with a plurality of data packets. In one embodiment, the data is sent 406 interspersed with test packets. The test packets are interspersed into the data packets such that the receiving node is able to continually process the data packets. Thus, the test packets are interspersed at a variable rate to test the communication link without disabling the ability of the communication link to send and receive other data.

The data may be sent in "burst data transfers" where data is sent in multiple bytes without intervention by the microprocessor. In one embodiment, data is moved from a hard disk into a buffer on the before it is transferred across the communication link. Sending data 406 may include assigning a priority to the test packets. In one embodiment, enough test packets are sent 406 over the communication link to emulate a predetermined error rate for the communication link and/or receiving node.

The test packets may be manually interspersed into the data packets at regular time intervals. In one embodiment, the test packets may be automatically interspersed into the data packet stream based on any number of performance factors. For example, if the system's resources are otherwise fully engaged, the test packets may be sent at a time when the system has resources that can be freed up.

In one embodiment, the test packets are randomly interspersed into the data packets. It will be appreciated by those of skill in the art that random data typically creates more errors than sending data in a particular pattern or set of patterns, and that this may provide a clearer assessment of any errors over a communication link.

The packets are checked 410 for errors and method 400 ends 412. The packets are checked 410 after being received by the receiving node on the other end of the communication link. Checking the packets includes recording errors in an error register. The register may be part of the hardware chipset and may be programmed to also determine test packet priorities and test packet utilization rates. In one embodiment, only test packets are checked for errors. The test packets may include random data that provides an error picture that in one embodiment obviates the ness to check the CRC test for the regular data.

The method may also include the step of repeating the process of repeating the steps 402 through 410 until a predetermined error threshold is met.

Figure 5:
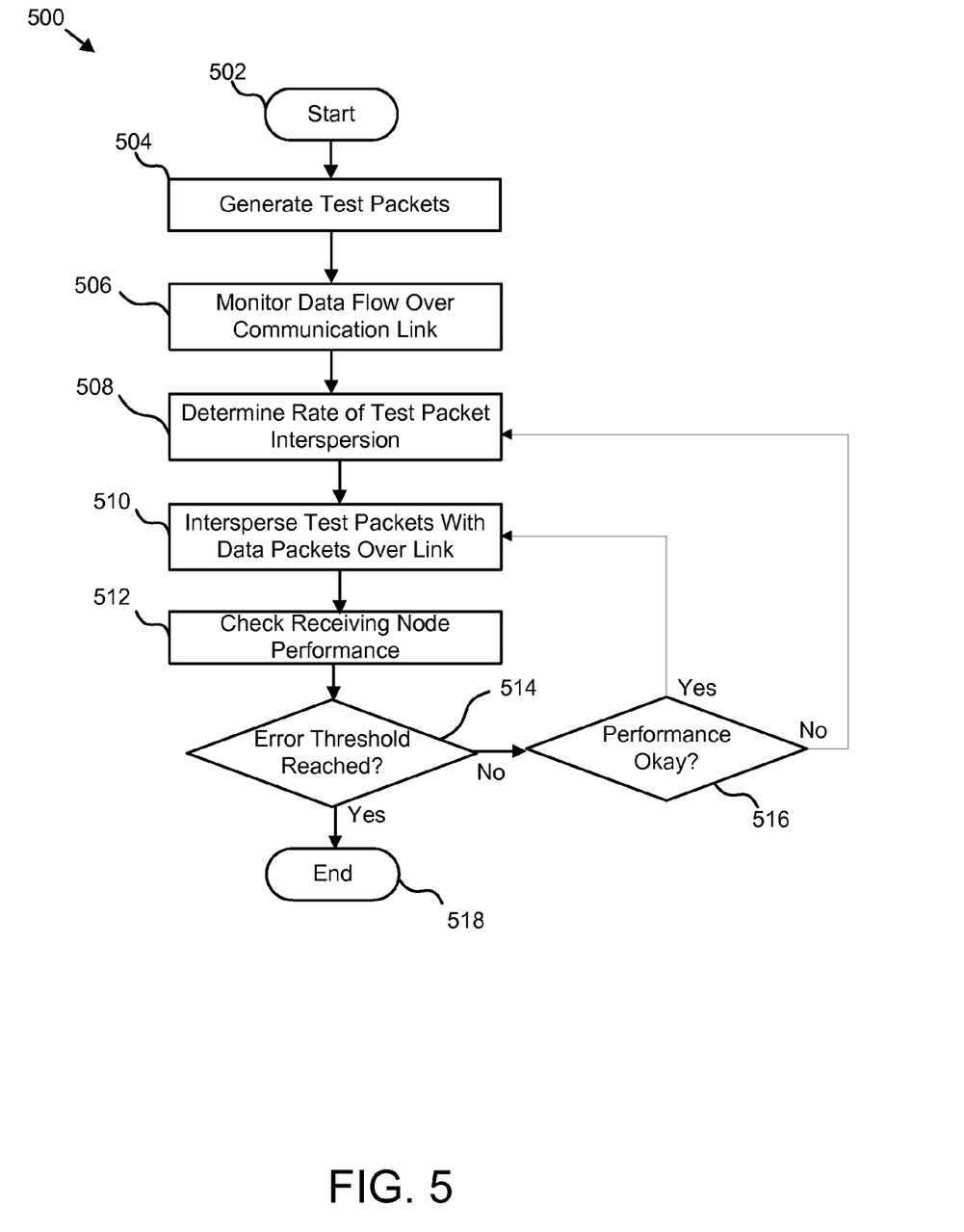
FIG. 5 is a schematic flow chart diagram illustrating one embodiment of a method for assessing error over a communication link.

Referring now to FIG. 5, an alternative method 500 of assessing error over a communication link is illustrated. The method starts 502 and generates 504 one or more test packets. The flow of data over a communication link may be monitored 506. The rate at which test packets are to be interspersed into the data is determined 508. Test packets are then interspersed 510 with data packets over the communication link to be tested. It will be appreciated by those skilled in the art the communication link may include collectively or separately, a cable or wire, a sending point, and an ending point. In one embodiment, the ending point is a receiving node.

The performance of the communication link is checked 512 in order to determine whether the number of test packets being sent is inhibiting the performance of the communication link at an unacceptable level. For example, if too many test packets are being sent, the flow of regular data may be impeded to an unacceptable level. This level may be predetermined, or it may be adjustable based on a variety of factors and the needs of the user.

A predetermined error threshold is then determined 514. For example, it may be advantageous to send a minimum number of test packets to approximate a known error threshold for a particular communication link. For example, if the standard rate for a particular port, or other receiving node is one error for every million bytes of data, the method 500 may send one million bytes of data in order to get a clear picture of errors occurring over the communication link. If the threshold has not been reached the performance of the communication link is rechecked 516. If the performance is below desired levels, the rate at which test packets are interspersed into the data is reevaluated 508. If the performance is okay, interspersing 510 test packets continues. When the desired threshold of test packets is met 514, the method ends 518.

In one embodiment, the above-described method is accomplished in the form of operations by a computer program product or a signal-bearing medium tangibly embodying a program of machine-readable instructions executable by a digital processing apparatus. In one embodiment, a computer program product includes or tangibly embodies a computer readable medium having computer usable program code for facilitating the access of system information. The computer program product includes computer usable program code to implement the methods described above. The method and corresponding program code may also include the steps necessary to carry out the function of the modules described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for assessing error over a communication link, the method comprising:
   creating one or more test packets by way of a processor and a memory, each test packet comprising data to facilitate error checking after the test packet is transmitted over a communication link;
   monitoring performance of one or more of a receiving node and the communication link, the performance based on an amount of traffic;
   periodically determining an amount of test packets to send over the communication link to the receiving node;
   sending a plurality of data packets over the communication link to the receiving node;
   sending one or more test packets over the communication link to the receiving node; and
   interspersing test packets throughout the data packets at a variable rate, the variable rate based on the performance of one or more of the receiving node and the communication link, wherein the variable rate of interspersed test packets decreases as the performance slows and the variable rate of interspersed test packets increases as the performance increases such that the communication link is continuously enabled to non-test packet data traffic and the receiving node is able to continually process the data packets.

2. The method of claim 1, wherein determining the amount of test packets comprises determining a percentage of the number of packets sent to the receiving node to be allocated for sending test packets, wherein the percentage of test packets comprises up to ninety percent.

3. The method of claim 1, wherein sending test packets comprises selectively assigning a priority to consecutive test packets.

4. The method of claim 1, wherein sending one or more test packets over the communication link comprises sending a threshold level of test packets to emulate a predetermined error rate for the receiving node.

5. The method of claim 1, wherein interspersing test packets throughout the data packets comprises randomly interspersing test packets throughout the data packets.

6. The method of claim 1, further comprising checking packets received by the receiving node for errors, wherein checking the packets received by the receiving node for errors comprises recording errors in an error register.

7. The method of claim 1, further comprising monitoring an amount of traffic on the communication link, wherein the amount of test packets to send over the communication link to the receiving node is based on the amount of traffic.

8. An apparatus for assessing error over a communication link, the apparatus comprising:
   a creation module for creating one or more test packets, each test packet comprising data to facilitate error checking after the test packet is transmitted over a communication link;
   a determination module for monitoring performance of one or more of a receiving node and the communication link and periodically determining an amount of test packets to send over a communication link to the receiving node, the performance based on an amount of traffic;
   a sending module for sending a plurality of test packets over the communication link to the receiving node; and
   an interspersing module for interspersing test packets throughout a plurality of data packets at a variable rate, the variable rate based on the performance of one or more of the receiving node and the communication link, wherein the variable rate of interspersed test packets decreases as the performance slows and the variable rate of interspersed test packets increases as the performance increases such that the communication link is continuously enabled to non-test packet data traffic and the receiving node is able to continually process the data packets, wherein all or a portion of the creation module, the determination module, the sending module, and the interspersing module comprise one or more of logic hardware and executable code, the executable code stored on one or more non-transitory computer readable storage media and executed by a processor.

9. The apparatus of claim 8, wherein the sending module is configured to send one or more data packets over the communication link to the receiving node.

10. The apparatus of claim 8, wherein the amount of test packets is a percentage of the overall packets sent to the receiving node.

11. The apparatus of claim 8, wherein the sending module selectively assigns a priority to consecutive test packets.

12. The apparatus of claim 8, wherein the sending module sends a threshold level of test packets to emulate a predetermined error rate for the communication link.

13. The apparatus of claim 8, wherein the interspersing module randomly intersperses test packets throughout the data packets.

14. The apparatus of claim 8, wherein the determination module monitors an amount of traffic on the communication link and periodically determines an amount of test packets to send over a communication link to the receiving node based on the amount of traffic.

15. The apparatus of claim 8, further comprising a checking module, for checking test packets received by the receiving node for errors, wherein the checking module monitors only test packets for errors.

16. A system for assessing error over a communication link, the system comprising:
   at least one Central Processing Unit (CPU);
   a processor;
   a cache;
   a cache controller;
   at least one port for connecting to a communication link; and
   a memory containing modules for execution on a processor, the modules comprising:
      a creation module for creating one or more test packets, each test packet comprising data to facilitate error checking after the test packet is transmitted over a communication link;
      a determination module for monitoring performance of one or more of a receiving node and the communication link and periodically determining an amount of test packets to send over a communication link to the receiving node, the performance based on an amount of traffic;
      a sending module for sending a plurality of test packets over the communication link to a receiving node;
      an interspersing module for interspersing test packets throughout a plurality of data packets at a variable rate, the variable rate based on the performance of one or more of the receiving node and the communication link, wherein the variable rate of interspersed test packets decreases as the performance slows and the variable rate of interspersed test packets increases as the performance increases such that the communication link is continuously enabled to non-test packet data traffic and the receiving node is able to continually process the data packets; and
      a checking module, for checking test packets received by the receiving node for errors; and
   a bus for operably connecting the at least one CPU, processor, cache, cache controller, port, and memory.

17. The system of claim 16, wherein the port is a high-speed serial port.

18. The system of claim 16, further comprising a plurality of scalable enterprise servers.

19. A computer program product comprising a non-transitory computer useable storage medium having a computer readable program, wherein the computer readable program when executed on a computer causes the computer to:
   creating one or more test packets, each test packet comprising data to facilitate error checking after the test packet is transmitted over a communication link;
   monitoring performance of one or more of a receiving node and the communication link, the performance based on an amount of traffic;
   periodically determining an amount of test packets to send over the communication link to the receiving node;
   sending a plurality of data packets over the communication link to a receiving node;
   sending one or more test packets over the communication link to the receiving node; and
   interspersing test packets throughout the data packets at a variable rate, the variable rate based on the performance of one or more of the receiving node and the communication link, wherein the variable rate of interspersed test packets decreases as the performance slows and the variable rate of interspersed test packets increases as the performance increases such that the communication link is continuously enabled to non-test packet data traffic and the receiving node is able to continually process the data packets.

20. The computer program product of claim 19, wherein the computer readable program for causing a computer to determine the amount of test packets comprises determining a percentage of the number of packets sent to the receiving node to be allocated for sending test packets.

21. The computer program product of claim 19, wherein the computer readable program for causing a computer to send test packets comprises selectively assigning a priority to each test packet.

22. The computer program product of claim 19, wherein the computer readable program for causing a computer to send one or more test packets over the communication link comprises sending a threshold level of test packets to emulate a predetermined error rate for the receiving node.

23. The computer program product of claim 19, wherein the computer readable program for causing a computer to intersperse test packets throughout the data packets comprises randomly interspersing test packets throughout the data packets.

24. The computer program product of claim 19, further comprising checking packets received by the receiving node for errors, wherein the computer readable program for causing a computer to check the packets received by the receiving node for errors comprises recording errors in an error register.

* * * * *